भारत

2,915,429
O,O'-DIETHYL-DITHIOPHOSPHORIC ACID-S-(DI-METHYL - THIOCARBAMYL - MERCAPTOMETH-YL)-ESTER INSECTICIDES

Otto Scherer and Helmut Hahn, Frankfurt am Main, Germany, assignors to Farbwerke Hoechst Aktiengesellschaft vormals Meister Lucius & Brüning, Frankfurt am Main, Germany, a corporation of Germany No Drawing. Application September 17, 1957
Serial No. 684,427

5 Claims. (Cl. 167—22)

In the art of pest control it is known to use neutral organic phosphoric acid esters.

Now, we have found that the O,O'-diethyl-dithiophosphoric acid-S-(dimethyl-thiocarbamyl-mercaptomethyl)-ester shows excellent acaricidal, insecticidal and ovicidal properties and is superior to comparable compounds as regards efficiency. Moreover, it is of reduced toxicity towards warm-blooded animals ($LD_{50}$=130 milligrams when orally given to rats).

The compound corresponds to the formula

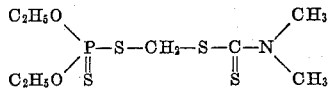

The compound according to the invention can be prepared, for instance, by reacting sodium N-dimethyl-dithiocarbamate with O,O'-diethyl-dithiophosphoric acid-S-(chloromethyl)-ester. It is likewise possible to react, for example, N,N-dimethylthiocarbamic acid chloride with the sodium compound of the O,O'-diethyl-dithiophosphoric acid-S-(mercapto-methyl)-ester. The product obtained according to the invention is characterized by an excellent efficiency in plant protection, stock protection and hygienic pest control. Its action on spider mites in all stages of development is most important.

The active substance can be used in formulations for dry and wet application, for example in the form of a spray, a dust, or a solution, if necessary in admixture with other insecticides, acaricides, ovicides, fungicides and/or synergists.

The following examples serve to illustrate the invention but they are not intended to limit it thereto, the parts being by weight:

Example 1

An emulsifiable spray containing 10 parts of O,O'-diethyl - dithiophosphoric acid-S-(dimethyl-thiocarbamyl-mercapto-methyl)-ester, 78 parts of absolute denatured ethyl alcohol, 10 parts of a wetting agent and 2 parts of epichlorhydrin kills spider mites in all stages of development, for example on beans, when applied in a concentration of the final compound amounting to 0.3%. A single spraying applied in the same concentration kills all eggs of the spider mites so that the whole population is destroyed.

Example 2

When chicken mites (*Dermanyssus gallinae*) are brought into Petri dishes on paper filters treated with 0.24 milligram/100 square centimeters of the pure active substance of O,O'-diethyl-dithiophosphoric acid-S-(dimethyl-thiocarbamyl-mercaptomethyl)-ester by impregnation in acetonic solution, all animals die within 3 days.

Example 3

When placing pest fleas (*Xenopsylla cheopis*) in Petri dishes treated with a dust formulation containing 2% of O,O'-diethyl-dithiophosphoric acid-S-(dimethyl-thiocarbamyl-mercaptomethyl)-ester in talcum and applied in a concentration of 10 milligrams/100 square centimeters all test animals die within 48 hours.

Example 4

Chrysanthemum plants considerably infected with aphids sprayed with the emulsion of an emulsifiable spray consisting of 10% of O,O'-diethyl-dithiophosphoric acid-S-(dimethyl-thiocarbamyl-mercaptomethyl)-ester, 80% of ethyl alcohol and 10% of an emulsifier in a concentration of 0.03%, are free from lice one day after the treatment.

We claim:

1. A pesticidal composition comprising as an essential active ingredient a compound of the formula

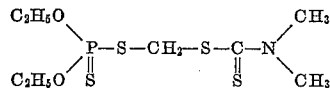

2. A pesticidal composition comprising as an essential active ingredient a compound according to claim 1 and a carrier therefor.

3. A pesticidal composition comprising as an essential active ingredient a compound according to claim 1 and an organic solvent therefor.

4. A pesticidal composition comprising as an essential active ingredient a compound according to claim 1 and talcum as a carrier therefor.

5. Method of combating insects which comprises applying to them a composition comprising, as an essential active ingredient, a compound of the formula.

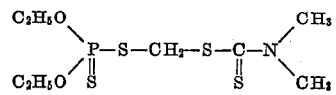

References Cited in the file of this patent
UNITED STATES PATENTS
2,494,283    Cassaday _____ Jan. 10, 1950